United States Patent
Adeline (10) Patent No.: US 12,355,281 B2
(45) Date of Patent: Jul. 8, 2025

(54) DEVICE FOR THE CONCOMITANT STORAGE AND GENERATION OF AT LEAST ONE VOLTAGE, AND ASSOCIATED MANAGEMENT METHOD

(71) Applicants: Valmir Adeline, Chilly-Mazarin (FR); MOV'NTEC, Chilly-Mazarin (FR)

(72) Inventor: Valmir Adeline, Chilly-Mazarin (FR)

(73) Assignee: BAT'NTEC, Ruitz (FR)

( * ) Notice: Subject to any disclaimer, the term of this patent is extended or adjusted under 35 U.S.C. 154(b) by 72 days.

(21) Appl. No.: 18/547,981

(22) PCT Filed: Feb. 25, 2022

(86) PCT No.: PCT/FR2022/050348
§ 371 (c)(1),
(2) Date: Aug. 25, 2023

(87) PCT Pub. No.: WO2022/180346
PCT Pub. Date: Sep. 1, 2022

(65) Prior Publication Data
US 2024/0136831 A1 Apr. 25, 2024
US 2024/0235219 A9 Jul. 11, 2024

(30) Foreign Application Priority Data
Feb. 26, 2021 (FR) ...................................... 2101929

(51) Int. Cl.
*H02J 7/00* (2006.01)
*H01M 10/44* (2006.01)
*H01M 10/48* (2006.01)

(52) U.S. Cl.
CPC ......... *H02J 7/0024* (2013.01); *H01M 10/441* (2013.01); *H01M 10/482* (2013.01);
(Continued)

(58) Field of Classification Search
CPC .... H01M 10/441; H01M 10/482; H02J 1/102; H02J 3/32; H02J 7/0013; H02J 7/0014;
(Continued)

(56) References Cited

U.S. PATENT DOCUMENTS 10,449,868 B2  10/2019  Hale
11,658,485 B2   5/2023  Despesse et al.
(Continued)

FOREIGN PATENT DOCUMENTS

EP   2681798      1/2014
WO   2017205466  11/2017
WO   2019234348  12/2019

OTHER PUBLICATIONS

International Search Report for application No. PCT/FR2022/050348 dated May 27, 2022.

*Primary Examiner* — Levi Gannon
(74) *Attorney, Agent, or Firm* — Perman & Green, LLP (57) ABSTRACT

A device for storing electrical energy, including a plurality of switched individual cells contained inside a storage pack, a master block and a supply block supplying a DC voltage to the storage pack and the master block. In such a storage device, the storage pack is subdivided into a plurality of storage blocks, each storage block including a plurality of switched cells and a control logic sub-block for controlling each switched cell of the storage block. Each storage block furthermore also includes at least one connection sub-block for connection to a bus, each connection sub-block including an electronic switch having two positions, one position, called connected position, in which the electronic switch is open so that the storage block supplies the bus with a voltage, and one position, called short-circuit position, in which the electronic switch is closed.

19 Claims, 5 Drawing Sheets

(52) U.S. Cl.
CPC .......... *H02J 7/0013* (2013.01); *H02J 7/0016* (2013.01); *H02J 7/0019* (2013.01)

(58) Field of Classification Search
CPC ...... H02J 7/0016; H02J 7/0018; H02J 7/0019; H02J 7/0024; H02J 7/0025; H02J 7/0031; H02J 7/0063; H02J 7/0068
See application file for complete search history.

(56) References Cited

U.S. PATENT DOCUMENTS

| | | | |
|---|---|---|---|
| 2008/0239628 A1* | 10/2008 | Tatebayashi | H02J 7/00306 361/434 |
| 2012/0086390 A1* | 4/2012 | Lim | H02J 7/0019 320/134 |
| 2012/0274140 A1* | 11/2012 | Ganor | H02J 7/00 307/71 |
| 2020/0144845 A1* | 5/2020 | Facchini | H02J 50/12 |
| 2020/0280197 A1* | 9/2020 | Winger | B60L 3/0084 |
| 2020/0395771 A1 | 12/2020 | Hiratsuka | |
| 2021/0083331 A1* | 3/2021 | Kunimitsu | H01M 10/4207 |
| 2021/0288591 A1* | 9/2021 | Kuhn | H02M 7/4835 |
| 2022/0115879 A1* | 4/2022 | Kahn | H02J 7/0036 |
| 2023/0387700 A1* | 11/2023 | Singer | H01M 10/441 |

\* cited by examiner

DEVICE FOR THE CONCOMITANT STORAGE AND GENERATION OF AT LEAST ONE VOLTAGE, AND ASSOCIATED MANAGEMENT METHOD

CROSS REFERENCE TO RELATED APPLICATIONS

This application is a National Stage of International Application No. PCT/FR2022/050348, having an International Filing Date of 25 Feb. 2022, which designated the United States of America, and which International Application was published under PCT Article 21(2) as WO Publication No. 2022/180346 A1, which claims priority from and the benefit of French Patent Application No. 2101929 filed on 26 Feb. 2021, the disclosures of which are incorporated herein by reference in their entireties.

BACKGROUND

Field

The disclosure relates to the electronics field.

More specifically, the disclosure relates to a device for the concomitant storage and generation of at least one electrical voltage, and an associated management method.

In particular, the disclosure finds applications for powering with an AC or DC type electrical voltage any type of electrical equipment, in various fields of application, such as consumer electronics, transport—including the automotive, railway and aeronautic fields—or any other field powered by an electric current.

BRIEF DESCRIPTION OF RELATED DEVELOPMENTS

So-called switched battery techniques are known from the prior art allowing supplying a voltage in any form, and more particularly of the DC type or of the AC type at a given frequency, from a DC voltage stored, for example in an electrochemical form, in a plurality of elementary cells which are entities capable of storing and recovering electrical energy, built around one or more technolog(y/ies).

Such prior techniques implement a particular switching strategy allowing generating one single electric current signal having the appropriate voltage, or frequency, form by combining by addition, by subtraction and/or by inversion different electric currents originating from the elementary cells.

Besides the fact that they generate only one single electric current, defined by its voltage, simultaneously, the major drawback of current techniques is their lack of reliability in the quality of the generated voltage, in particular upon failure of one cell or part of the cells. When such a failure occurs, the performance of current switched batteries degrades, generally resulting in a shutdown of the current supply at the output of the switched battery.

Thus, current techniques are not suited to an industrial use where the reliability of the supplied energy is essential.

Finally, another major drawback of existing techniques is that they are generally not optimized in terms of their intrinsic energy consumption because all of the controllers of the individual cells composing the battery are powered, even when the selected output voltage requires the operation of only part of the cells among all of the individual cells composing the switched battery. This excessive consumption results in a considerable additional power supply or a reduction in the autonomy of the switched batteries, in particular when these are self-powered.

None of the current systems allows simultaneously meeting all of the required needs, namely to provide a switched battery technique which offers the possibility of generating multiple currents simultaneously with an optimized energy consumption, while being easy to industrialize, and while having easy management and maintenance in the event of failure of part of the cells of the switched battery.

SUMMARY

The present disclosure aims to overcome all or part of the aforementioned drawbacks of the prior art.

To this end, according to a first aspect, the disclosure relates to an electrical energy storage device, comprising a plurality of switched elementary cells included inside a storage pack, a master block and a supply block supplying the storage pack and the master block with a direct current.

Such a storage device, commonly referred to as a switched battery, allows supplying an electric current in any form with a voltage comprised within a predetermined range, for example between 0 and 220 V.

An elementary cell is so-called switched when it is associated with at least one switch allowing modifying the connection of the elementary cell to an electronic circuit, and consequently the voltage supplied by the elementary cell to said electronic circuit.

It should be pointed out that a switched elementary cell may be arbitrary combining one or more elementary cell(s) with one or more switch(es). The positioning of the elementary cell(s) and of the switch(es) in the switched elementary cell may also be arbitrary, either in series or in parallel, to the extent that the management of the switches allows controlling the voltage at the terminals of the switched elementary cell.

Next, by switched elementary cell, or switched cell, it should be understood the elementary cell(s) and associated switch(es) assembly.

Preferably, the switched elementary cell corresponds to an elementary cell connected in series with a first switch, the elementary cell and the first controllable switch could be short-circuited by a second switch placed in parallel.

In general, the switches of the elementary cell are of the electronically-controllable type. For example, such switches are transistors, more particularly field-effect transistors, also referred to by the acronym FET ("Field Effect Transistor"), and possibly metal-oxide semiconductor field-effect transistors, also referred to by the acronym MOSFET ("Metal Oxide Semiconductor Field Effect Transistor"), or any other type known to a person skilled in the art.

According to the disclosure, the storage pack is subdivided into a plurality of storage blocks, each storage block comprising a plurality of switched elementary cells and a logic sub-block for controlling each switched elementary cell of said storage block.

In addition, each storage block also comprises at least one sub-block for connection to a bus, each connection sub-block comprising an electronic switch comprising two positions, a so-called connected position in which the storage block supplies a current to the bus and a so-called short-circuit position in which the associated storage block is short-circuited.

In other words, in the connected position, the electronic switch is open so that the storage block supplies voltage to the bus. In the short-circuit position, the switch is closed in order to disconnect the storage block from the bus. Furthermore, each storage block advantageously comprises a means of isolation from the bus either by means of a H-bridge where the switches are open in the short-circuit position, or directly at the switched cells by opening of the switches of each switched cell. In both cases, isolation from the bus allows avoiding damaging the elementary cells or creating short circuits between the different buses.

Thus, thanks to the electronic switch, it is possible to independently manage each storage block by having the possibility of connecting and disconnecting them from the bus according to their state-of-charge and their performance, in particular in terms of efficiency.

In other words, via a connection sub-block, it is possible to manage the connection or disconnection of a storage block of the storage pack with a bus in particular according to a general voltage and frequency setpoint of the electric current to be generated by the electronic device for storing electrical energy. The management of the connections also depends on the state-of-charge of the elementary cells of the storage block, and possibly on an analysis of the voltage supplied by the storage block with to an expected voltage, calculated according to the general setpoint.

Thanks to the subdivision into blocks and to the presence of a connection sub-block, a storage block deemed to be defective in the supply of electric current, defined by its voltage, to the bus can thus be set off circuit in order to avoid a complete degradation of the operation of the switched battery.

By multiplying the connection sub-blocks and consequently the buses, it is possible to simultaneously generate several types of voltage with the same storage pack. It is also possible to manage charging of a portion of the storage pack concomitantly with the generation of a current by another portion of the storage pack. Thus, the electronic architecture object of the present disclosure offers multiple technical advantages not provided for by the architectures of the prior art.

Thus, for example, it is possible to generate on one bus an alternating current with a 220 V voltage at a 50 Hz frequency and on another bus a direct current with a 48 V voltage. In parallel, a third bus may be used to charge elementary cells of a storage block that is not used for the generation of the voltages on the first two buses.

It should also be pointed out that the supply block of the electrical energy storage device is advantageously distinct from the storage unit(s), the energy stored in the storage pack being used only for the generation of the current(s) supplied by the electronic device for storing and generating a current.

In particular embodiments of the disclosure, the electronic switch of at least one connection sub-block of a block for connection to a bus is of the galvanically-isolated type.

Thus, it is possible to connect a storage block to a bus in a secure manner, the voltage at said bus at the output of the storage pack being possibly high.

Preferably, the electronic switch is composed of at least one transistor which may be of the field-effect type (FET), and possibly of the metal-oxide semiconductor field-effect type (MOSFET), or of any other type known to a person skilled in the art.

Preferably, such a transistor is of the galvanically-isolated type.

It should be pointed out that a transistor generally has three terminals, one generally called gate or base, controlling the current flowing between the other two terminals, generally called drain and source, or collector and receiver.

In particular aspects of the disclosure, the electronic switch comprises two transistors connected in series, in an inverted manner.

Thus, the flow of the current through the electronic switch may be performed in both directions.

Two transistors are connected in an inverted manner, for example when the sources, or the receivers, of the two transistors are commonly connected.

Moreover, it should be pointed out that the gate or base terminals are generally commonly connected on an electronic component allowing controlling the state of the transistors composing the electronic switch.

In particular aspects of the disclosure, the storage device comprises an optocoupler configured to control the state of the electronic switch.

Preferably, a connection sub-block comprises an optocoupler configured to control the state of the electronic switch.

Preferably, the optocoupler comprises a light-emitting diode opposite a photovoltaic receiver.

Thus, the optocoupler can operate without energy consumption, which allows optimizing the energy consumption of the storage device.

Advantageously, the photovoltaic receiver is composed of at least one diode, preferably three, so-called photovoltaic, diode(s) configured to generate a voltage when they are illuminated by the light-emitting diode.

In particular aspects of the disclosure, the optocoupler also comprises a circuit allowing discharging the photovoltaic receiver.

Thus, it is possible to minimize energy loss, by heat, at the electronic switch, in particular when the electronic switch toggles into a short-circuit state.

In particular aspects of the disclosure, at least one sub-block for connection to a bus of at least one storage block also comprises an H-bridge configured to invert the voltage at the output of the corresponding storage block, the H-bridge comprising four switchable elements.

In particular aspects of the disclosure, at least one storage block also comprises a logic circuit controlling the state of the electronic switch of at least one connection sub-block based on the analysis of information characterizing the H-bridge, and/or the state-of-charge of the storage block.

In particular aspects of the disclosure, the switching elements of the H-bridge are transistors and the information analyzed by the logic block comprise a voltage gate of said transistors of the H-bridge.

More particularly, the transistors of the H-bridge may consist of field-effect transistors, and possibly metal-oxide semiconductor field-effect transistors, or any other type known to a person skilled in the art.

In particular aspects of the disclosure, the storage device comprises a plurality of buses, each bus being connected at the output of a distinct connection sub-block of each storage block.

In particular aspects of the disclosure, each storage block also comprises:
  a control circuit for all or part of the switches associated with the elementary cells;
  a DC/DC converter supplying the control circuit with the voltage supplied by the supply block.

In particular aspects of the disclosure, the master block is configured to control the storage blocks via at least one of the following elements:
  a control bus connecting the master block and each storage block;
  a generator of a voltage and/or frequency setpoint of the current to be produced for each storage block, the storage circuit of each considered storage block controlling all or part of the switches associated with the elementary cells according to the setpoint received by said storage block;

a generator of signals allowing controlling the state of at least one controllable switch in order to short-circuit at least one storage block;

a device for analyzing the power supplied by the DC/DC converter of each storage block and the associated efficiency, by means of PWM signals;

a device for controlling the voltage at the output of the supply block.

In particular aspects of the disclosure, the power supply comprises:

an energy storage module allowing supplying energy when the storage device is set on standby;

a power supply circuit connected at the output of the storage pack.

In particular aspects of the disclosure, the supply block comprises a module for converting the voltage at the input of the supply block when the supplied voltage is of the alternating type, said conversion module comprising a rectifier bridge and a capacitor.

In particular aspects of the disclosure, the electrical energy storage device also comprises a power supply circuit connecting a storage block to the master block in order to supply a voltage to said master block.

Preferably, the power supply circuit comprises a galvanic isolation.

It should be pointed out that the galvanic isolation is necessary only if the storage block used to power the master block does not share grounding with the master block.

According to a second aspect, the disclosure also relates to a method for managing the storage device according to any one of the preceding aspects, said management method comprising steps of:

determining a voltage setpoint for each storage block from a general voltage and frequency setpoint;

modifying the state of at least one connection sub-block of a storage block according to the voltage setpoint determined before.

It should be pointed out that the general voltage and frequency setpoint allows obtaining a current having a given voltage and frequency. For example, the value of the voltage is comprised between 0 and 400 V. In turn, the value of the frequency is for example comprised between 0 (direct current) and 100 Hz. In general, the general setpoint for the generation of a voltage corresponds to standard values of alternating current electrical voltage (120 or 230 V, 50 or 60 Hz) or of direct current electrical voltage (for example 12 or 48 V).

Moreover, a converter may advantageously be added at the output to supply a 5 V DC voltage from a higher voltage.

In particular implementations of the disclosure, the management method also comprises a step of analyzing the voltage supplied by a storage block to a bus, said analysis comprising sub-steps of:

measuring the voltage supplied by said storage block to said bus;

comparing the measured voltage with the voltage expected by the current setpoint associated with said storage block;

identifying said defective storage block when the difference between the measured voltage and the voltage expected for said storage block is in absolute value higher than a predetermined threshold value;

if said storage block is identified as defective, short-circuiting said storage block by controlling the electronic switch of the sub-block for connection to said bus.

In particular implementations of the disclosure, the determination of the voltage setpoint for each storage block takes account of the state-of-charge of each storage block.

Finally, according to a third aspect, the disclosure relates to an electronic component storing instructions for the implementation of the management method according to any one of the preceding implementations.

In general, such an electronic component is included in an electronic device for storing and generating a current according to any one of the preceding aspects.

For example, the component may be a microcontroller, a programmable logic circuit, in particular of the FPGA type (acronym of the term "Field-programmable gate array") or any other electronic component known to a person skilled in the art.

BRIEF DESCRIPTION OF THE FIGURES

Other advantages, aims and particular features of the present disclosure will appear from the following non-limiting description of at least one particular embodiment of the devices and methods objects of the present disclosure, with reference to the appended drawings, wherein.

DETAILED DESCRIPTION

The present description is given without limitation, each feature of one aspect could be advantageously combined with any other feature of any other aspect.

It should be noted that the figures are not plotted to scale.

Example of a Particular Aspect

Figure 1:
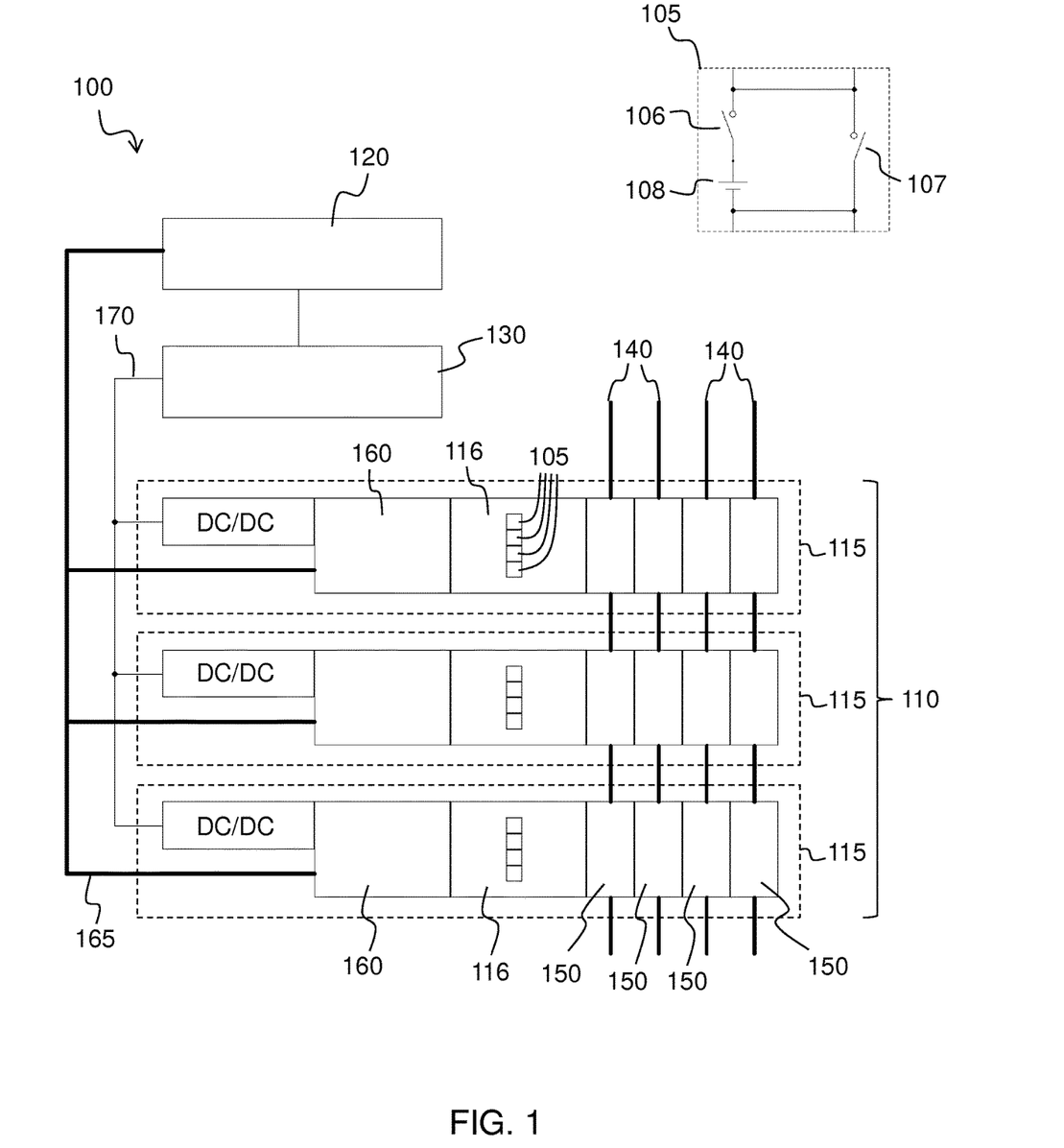
FIG. 1 is an electronic diagram of an embodiment of the electrical energy storage device according to the disclosure.

FIG. 1 is an electronic diagram of the electrical energy storage device 100 according to the disclosure.

The electrical energy storage device 100 comprises a plurality of switched elementary cells 105 forming a storage pack 110, a master block 120 controlling the generation of a voltage by the elementary cells of the storage pack 110 and an advantageously galvanically-isolated supply block 130.

An elementary cell stores electrical energy, for example in an electrochemical form by an oxidation-reduction phenomenon. An elementary cell conventional technology is based on reversible exchanges of lithium ions between two electrodes.

By switched elementary cell, it should be understood a storage elementary cell associated with at least one switch allowing controlling the charging/discharge of the elementary cell. As illustrated in the inset of FIG. 1, the switched elementary cell 105 preferably comprises two switches, a first one 106 connected in series with the elementary cell 108 and a second one 107 connected in parallel with the first switch 106 and the elementary cell 108.

It should be pointed out that the switched elementary cell 105 shown in the present non-limiting example of the disclosure could be generalized by a person skilled in the art to any type of architecture comprising at least one elementary cell and at least one switch, placed independently in series and/or in parallel, to the extent that the switch(es) allow(s) controlling the voltage at the terminals of the switched elementary cell.

The electronic device 100 is herein configured with four buses 140 at the output of the storage pack 110 allowing simultaneously generating up to four distinct, direct or alternating, voltages. One of the buses 140 may also be used in parallel to charge all or part of the elementary cells 108 of the storage pack 110.

Advantageously, the switched elementary cells 105 are distributed in the present non-limiting example of the disclosure between three storage blocks 115 of the storage pack 110 and can supply a voltage to at least one bus 140 via at least one of the four connection sub-blocks 150 included in the storage block 115. More specifically, the switched cells 105 of a storage block 115 are included in a storage sub-block 116 of the corresponding block 115. In the present non-limiting example of the disclosure, each storage block 115 comprises four switched cells 105.

It should be pointed out that the number of storage blocks 115 and of connection sub-blocks 150 is arbitrary, set according to the desired electronic architecture. A person skilled in the electronics art could generalize this aspect with no difficulty to an electronic device including a plurality of storage blocks, each block including at least one sub-block for connection to a bus.

Moreover, in the present non-limiting example of the disclosure, the storage blocks 115 are identical, but a person skilled in the art could easily generalize the present example to storage blocks 115 comprising any number of switched cells.

Each connection sub-block 150 allows connecting or disconnecting the storage block 115 corresponding to a bus 140 according to a setpoint determined by the master block 120 from a general voltage and frequency setpoint of the current to be generated at the output of the storage device 100.

The switched cells 105 are included inside a connection sub-block 116 which is driven by a control sub-block 160, connected to the master block 120 via a control bus 165.

Each storage block 115 also comprises a direct voltage DC/DC converter allowing converting the power supplied by the supply block 130 via a power supply bus 170, and supplying the control sub-block 160 in order to control the switches 106, 107 of the switched cells 105 and the connection sub-blocks 150.

Figure 2:
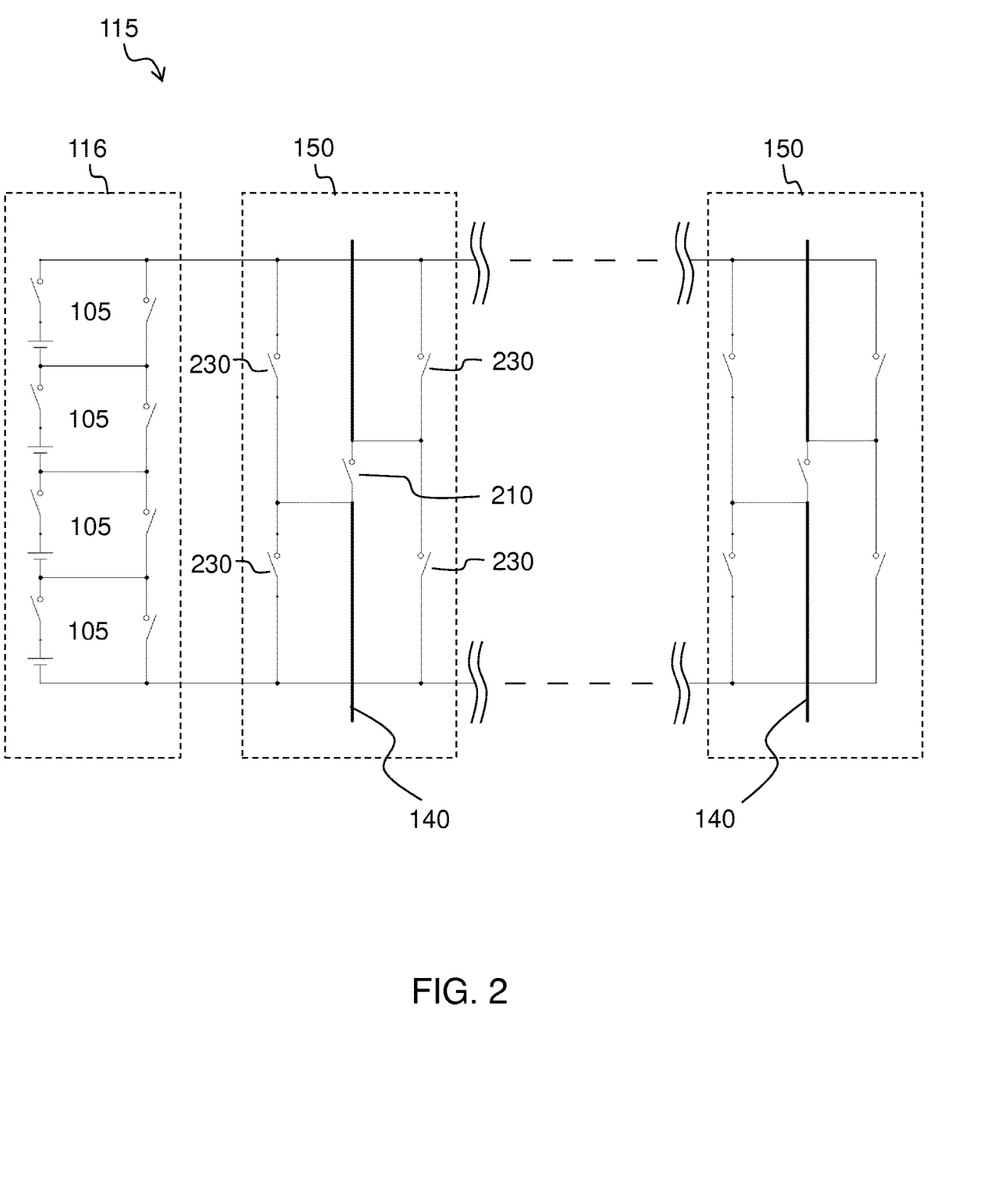
FIG. 2 is a detailed electronic diagram of a portion of a storage block of the electrical energy storage device of FIG. 1.

FIG. 2 illustrates in more detail the electronic diagram of the storage sub-block 116 and of the connection sub-blocks 150 of a storage block 115 of the electronic device 100.

In this FIG. 2, the storage sub-block 116 comprises four switched elementary cells 105 connected in series. It should be pointed out that the architecture of the storage sub-block 116 may be arbitrary, combining switched elementary cells in series and/or in parallel.

The storage sub-block 116 is connected in FIG. 2 to connection sub-blocks 150 allowing managing the connection or the short-circuiting of the sub-block 116 with at least one bus 140.

To this end, each connection sub-block 150 comprises a switch 210 allowing connecting the corresponding bus 140 to the terminals 220 of the storage sub-block 116.

Preferably, the switch 210 is of the galvanically-isolated type in order to enable connection and disconnection to the bus 140 in a secure manner. To this end, the electronic switch 210 may, for example, be composed of at least one metal-oxide semiconductor field-effect transistor, also known by the acronym MOSFET. Furthermore, to the extent that the switch 210 is galvanically-isolated, it is possible to completely disconnect a storage block 115 which then has zero electrical energy consumption. The supply of the DC/DC converter of the corresponding storage block 115 could then be stopped for electrical energy management purposes.

In order to control the polarity of the voltage supplied by the storage sub-block 116 to the terminals of the switch 210, the storage block 115 also comprises an H-bridge formed by four switchable elements 230.

When the storage block 115 is connected to a bus 140, the switch 210 of the corresponding connection sub-block 150 is open, the voltage at the terminals of said switch 210 being equal to the voltage at the terminals 220 possibly inverted by the H bridge.

Conversely, when the storage block 115 is disconnected from said bus 140, the switch 210 is in a closed state allowing short-circuiting the storage block 115 which then supplies no voltage to the bus 140. Advantageously, the switchable elements 230 of the H-bridge are in an open state in order to disconnect the storage block 115 from the bus 140 and to avoid a short-circuit between the terminals 220, in particular when the storage block 115 is simultaneously connected to another bus 140.

Figure 3:
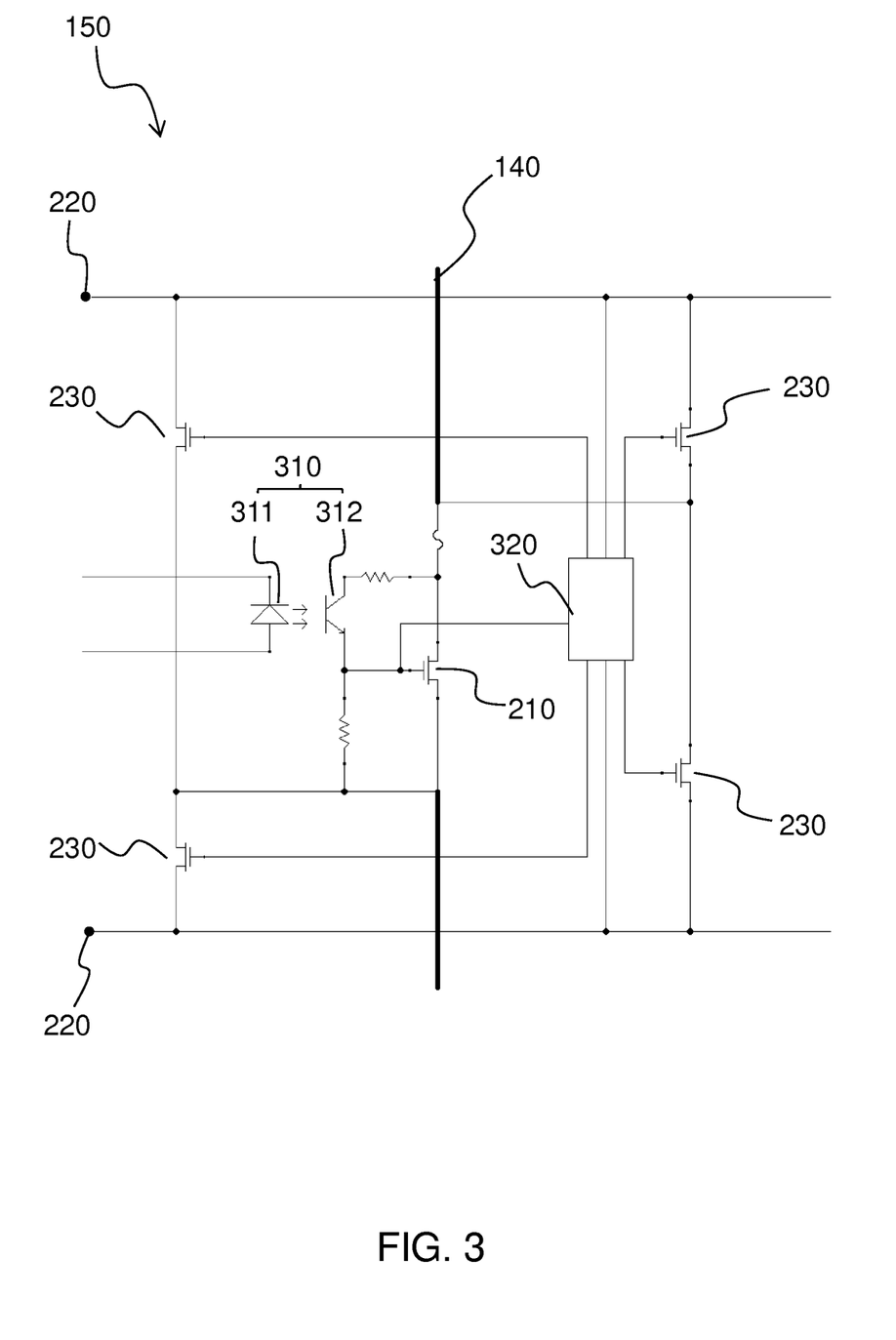
FIG. 3 is an embodiment of a connection sub-block of the storage block of FIG. 2.

FIG. 3 illustrates an example of an advantageous aspect of a connection sub-block 150 wherein the electronic switch 210 comprises two MOSFET transistors 350, preferably controlled by an optocoupler 310.

Advantageously, the optocoupler 310 may be of the static type—a type commonly known by the term "Solid State Relay"—comprising a light-emitting diode 311, commonly known by the acronym LED of the =term "Light Emitting Diode"), opposite a photovoltaic receiver 312, thereby allowing dispensing with a secondary power supply for the operation of the optocoupler 310. Such an optocoupler 310 allows supplying a voltage based on the power of the LED to control the two MOSFET transistors of the switch 210. Thus, it is possible to optimize the electrical consumption of the connection sub-block 150. In this non-limiting example of the disclosure, the photovoltaic receiver 312 comprises three photovoltaic diodes 313 able to generate an electrical voltage dependent on the light intensity emitted by the LED and received by the photovoltaic diode 313.

Alternatively, the two MOSFET transistors 350 of the switch 210 may be controlled by the logic block 320 based on the information supplied by the gate voltages of the MOSFET transistors composing, in the present non-limiting example of the disclosure, the switchable elements 230 of the H-bridge. Other information, such as the power supply at the output of the DC/DC converter of the storage block 115, may be taken into account alternatively or complementarily to the gate voltages of the H-bridge to control the switch 210.

Preferably, the two MOSFET transistors 350 of the switch 210 share their sources in order to be able to short-circuit the storage block 115 connected to the bus 140 more efficiently, by enabling the current to flow advantageously in both directions. Indeed, it should be pointed out that a MOSFET 350 transistor allows blocking the flow of a current in the direction from the drain to the source according to the voltage applied to the gate of the MOSFET transistor 350 but remains conducting for the flow of the current in the other direction, i.e. from the source towards the drain, through an equivalent diode 355 which has been illustrated, for clarity, in parallel with the MOSFET transistor 350 in FIG. 3.

It should be pointed out that this electronic diagram may be adapted to other types of transistors, in particular to transistors able to block the current flow in both directions.

The optocoupler 310 may also comprise a circuit 315 in parallel with the photovoltaic receiver 312 in order to discharge the photovoltaic receiver 312 in particular during a change of state of the switch 210, open or closed.

Figure 4:
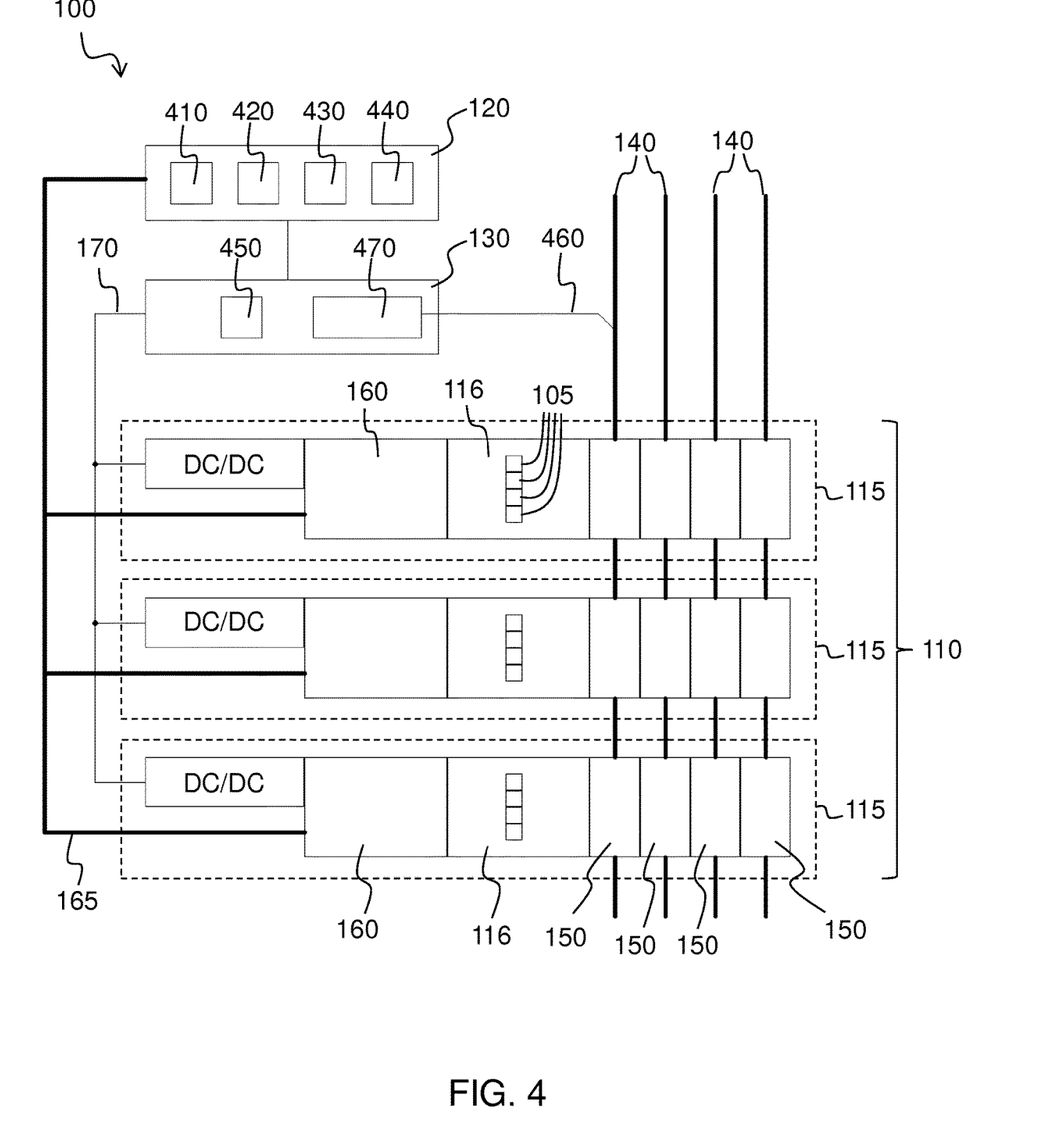
FIG. 4 is another electronic diagram of the electrical energy storage device of FIG. 1.

As illustrated in FIG. 4, the master block 120 is configured to control the storage blocks 115 of the pack 110 by communicating instructions via the control bus 165 connecting the master block 120 to each storage block 115.

To this end, the master block 120 comprises a generator 410 of a voltage, frequency, and possibly phase shift setpoint for a storage block 115. The setpoint is transmitted to the storage block 115 which processes the setpoint via the logic sub-block 160. The setpoint is translated by the logic sub-block 160 into a control schedule of the switches 106, 107 of the switched cells 105 in order to generate a current according to a given voltage and frequency, and possibly with a phase shift with respect to a predetermined time.

The setpoint may also result in a command of at least one connection sub-block 150 in order to supply the current defined by a voltage to at least one bus 140. This command may be performed via the logic sub-block 160 of the storage block 115 or via a signal generator 420 included in the master block 120. This signal generator 420 transmits signals whose voltage allows directly controlling the electronic switches 210, each generated signal being connected for example to the diode 311 of each optocoupler 310.

The master block 120 may also comprise a device 430 for analyzing the power supplied by the DC/DC converter of each storage block 115 and the efficiency of the corresponding DC/DC converter, by means of PWM signals (acronym for "Pulse Width Modulation") whose pulse widths are modulated. For example, the analysis of the voltage supplied by the DC/DC converter allows optimizing the efficiency of the DC/DC converter by adapting the setpoint transmitted to a storage block 115. To this end, the duty cycle of the PWM signals or the frequency of the PWM signal may be analyzed. In particular, the duty cycle allows calibrating the output power and the efficiency of the DC/DC converter. For example, while the frequency of the PWM signal allows optimizing the efficiency of the DC/DC converter according to the output power of the DC/DC converter.

A device 440 for controlling the voltage at the output of the supply block 130, for example of the microcontroller type, may also be included in the master block 120 for example in order to adapt the voltage on the bus 170 to the needs of the storage blocks 115.

Moreover, the supply block 130 may advantageously comprise an energy storage module 450 supplying energy to the master block 120 when the storage device 100 is set on standby. This storage module 450, which may be a cell or a battery, is independent of the elementary cells 108 in particular in order to limit the electrical consumption induced by the control of the switches 106, 107 when the electrical energy storage device 100 is set on standby. Thus, the storage device 100 could be optimized in terms of energy consumption.

The supply block 130 may also comprise a power supply circuit 460 connected to a bus 140 at the output of the storage pack 110 in order to self-power the storage device 100 in an operating phase, i.e. off standby.

Advantageously, the power supply circuit 460 may comprise a conversion module 470 allowing rectifying an alternating current supplied by the bus 140. In general, the conversion module 470 comprises a rectifier bridge and a capacitor.

Preferably, the first storage block 1151 one terminal of which is connected to a ground of the electrical energy storage device 100, i.e. the storage block 115 having the lowest voltage in the storage pack 110, may advantageously be used to power the master block 120 instead of the supply block 130 which will then be used only during start-up of the electrical energy storage device 100.

It is also possible to power the master block 120 by any other storage block 115 provided that a galvanic isolation is added in the connection between the selected storage block 115 and the master block 120 because of the difference in voltage of the selected storage block 115 which does not share the same ground as the master block 120.

Figure 5:
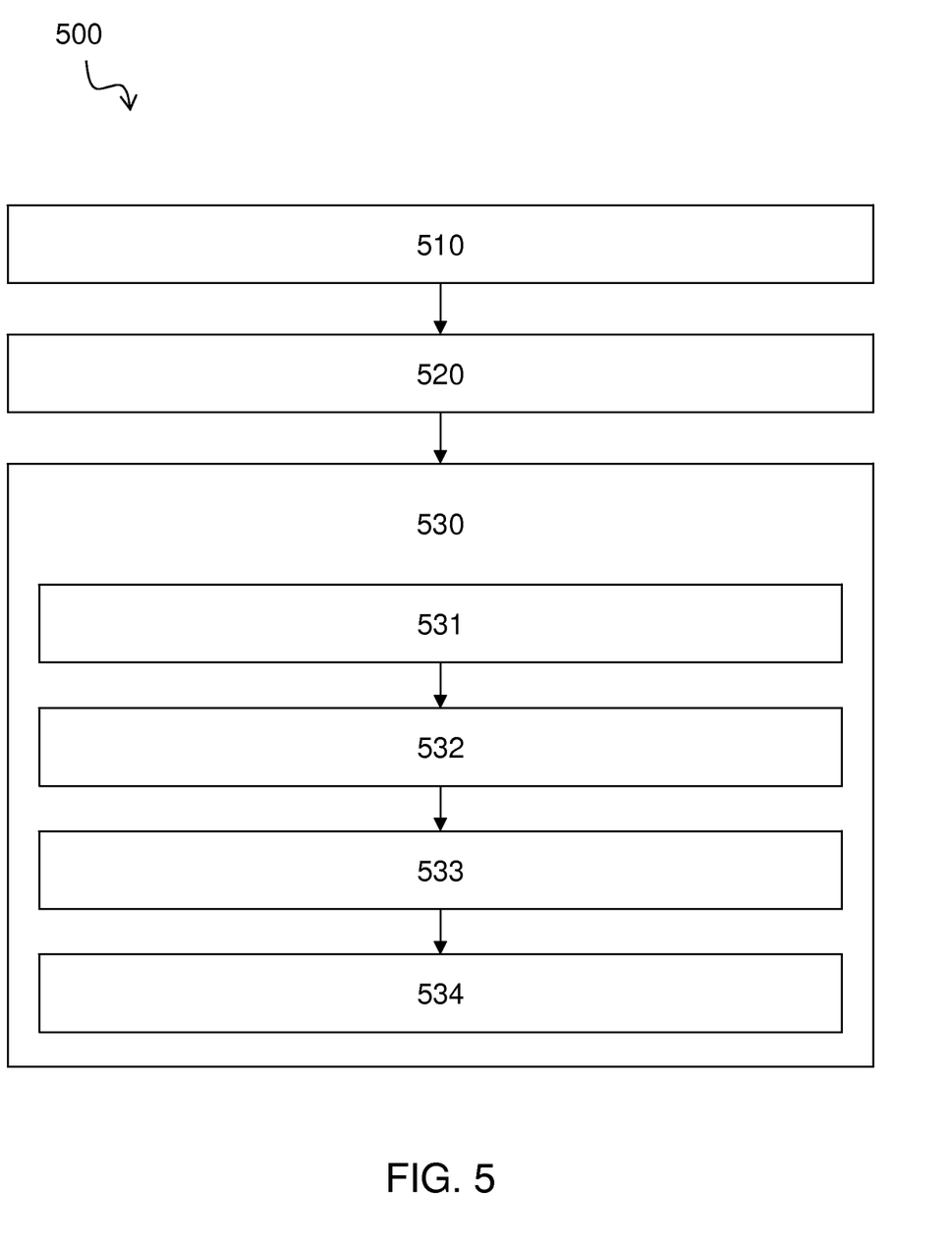
FIG. 5 is a flowchart of an example of implementation of a method for managing the electrical energy storage device of FIG. 1.

FIG. 5 illustrates in the form of a flowchart an example of implementation of a method 500 for managing the storage device 100 according to the disclosure.

The management method 500 comprises a first step 510 of determining a voltage setpoint for each storage block 115 from at least one general voltage and frequency setpoint. The general setpoint(s) determine(s) the voltage type, namely alternating or direct, or the possible frequency of the voltage to be generated on a bus or of the voltages to be generated simultaneously on different buses 140 by the storage device 100. In the case of a plurality of buses 140, the voltage setpoint may also advantageously comprise a bus number 140 associated with the current to be generated by the storage block 115. A phase shift setpoint with respect to a clock of the electronic storage device 100 may also be used in order to synchronize the generation of the current and/or of the alternating voltage by different storage blocks 115 for the same bus 140.

Based on the voltage setpoint for each storage block 115, the state of at least one connection sub-block 150 of a storage block 115 is modified during a second step 520, in particular by changing the state of the switch 210 and/or of the switchable elements 230 of the H-bridge, in order to connect/disconnect the storage block 115 with the corresponding bus 140 and/or to modify the polarity of the voltage generated by the switched cells 105 of the storage block 115.

It should be pointed out that the voltage setpoint for each storage block 115 is also reflected by a scheduling of the state of the switches of each switched cell 105 of the storage block 115 in order to generate the voltage expected by the setpoint.

Advantageously, the determination of the voltage setpoint for each storage block 115 takes account of the state-of-charge of the elementary cells 108 of each storage block 115, or the temperature of the elementary cells 108. The technology used for the cells 108 of a storage block 115 may also be taken into account in the determination of the setpoint for the storage block 115, some technologies could be more suited to the requested power, to the variations in voltage and current, or in temperature. Thus, for example, it is possible to select storage blocks 115 comprising elementary cells 108 suited to the high voltages associated in particular with the start-up of a load connected to the storage device 100.

It should also be pointed out that the voltage setpoint may also correspond to a recharging of the elementary cells 108 of a storage block 115 from a bus 140 opportunely dedicated to power the corresponding storage block 115.

Thus, thanks to the electronic architecture of the storage device 100, in particular by the presence of a plurality of buses 140 and connection sub-blocks 150, it is possible to charge and/or discharge one or more storage block(s) 115 independently and concomitantly.

The management method 500 may also comprise a step 530 of analyzing the voltage supplied by a storage block 115 to a bus 140.

During this analysis step 530, the voltage supplied by the storage block 115 to the bus 140 is measured during a first sub-step 531.

Afterwards, the measured voltage is compared with the voltage expected by the voltage setpoint associated with the storage block 115 for the corresponding bus 140 during a second sub-step 532.

When the difference between the measured voltage and the voltage expected for the storage block 115 is higher in absolute value than a predetermined value, the storage block 115 is identified as defective during a third sub-step 533.

Then, the storage block 115, considered to be defective, is short-circuited by the control of the electronic switch 210 of the sub-block 150 for connection to the corresponding bus 140 during a fourth sub-step 534.

Advantageously, the instructions for implementing the management method 500 are implemented in an electronic component of the storage device 100, such as an integrated circuit or a programmable logic circuit. Alternatively, the instructions for implementing the management method 500 may be stored inside a computer memory in order to be processed by a processor included in the storage device 100.

The storage device 100 may be in the form of a briefcase wherein the number of output connections is at least equal to the number of buses 140, in order to be easily carried by an individual who can move the storage device 100 in different locations according to the power supply needs.

Thanks to the architecture disclosed herein, the storage device 100 turns out to be a very modular switched type battery. Indeed, the generated voltage(s) can be easily selected according to the needs, for example thanks to a selector on the storage device 100.

What is claimed is:

1. A device for storing electrical energy, comprising a plurality of switched elementary cells included inside a storage pack, a master block and a supply block supplying the storage pack and the master block with a DC voltage, wherein the storage pack is subdivided into a plurality of storage blocks, each storage block including some of the plurality of switched elementary cells and a logic sub-block for controlling each switched elementary cell of said storage block, each switched elementary cell comprising at least one elementary cell and at least one switch, wherein each storage block also comprises at least one connection sub-block for connection to a bus, each connection sub-block including an electronic switch comprising two positions, a so-called connected position in which the electronic switch is open so that the storage block supplies a voltage to the bus and a so-called short-circuit position in which the electronic switch is closed, and the device further comprises a power supply circuit connecting a storage block to the master block in order to supply a voltage to said master block.

2. The storage device according to claim 1, wherein the electronic switch is of the galvanically-isolated type.

3. The storage device according to claim 2, wherein the electronic switch is composed of at least one metal-oxide semiconductor field-effect transistor.

4. The storage device according to claim 1, comprising an optocoupler configured to control the state of the electronic switch.

5. The storage device according to claim 4, wherein the optocoupler comprises a light-emitting diode facing a photovoltaic receiver.

6. The storage device according to claim 5, wherein the optocoupler also comprises a circuit allowing discharging the photovoltaic receiver.

7. The storage device according to claim 1, wherein at least one connection sub-block for connection to a bus of at least one storage block also comprises an H-bridge configured to invert the voltage at the output of the corresponding storage block, the H-bridge comprising four switchable elements.

8. The storage device according to claim 7, wherein at least one storage block also comprises a logic circuit controlling the state of the electronic switch of at least one connection sub-block based on the analysis of information characterizing the H-bridge, and/or the state-of-charge of the storage block.

9. The storage device according to claim 8, wherein the switching elements of the H-bridge are transistors and the information analyzed by the logic block comprises a voltage gate of said transistors of the H-bridge.

10. The storage device according to claim 1, comprising a plurality of buses, each bus being connected at the output of a distinct connection sub-block of each storage block.

11. The storage device according to claim 1, wherein each storage block also comprises a DC/DC converter configured to supply a control circuit with the voltage supplied by the supply block.

12. The storage device according to claim 1, wherein the master block is configured to control the storage blocks via at least one of the following elements:
   a control bus connecting the master block and each storage block;
   a generator of a voltage and/or frequency setpoint of the current to be produced for each storage block, the storage circuit of each considered storage block controlling all or part of the switches associated with the elementary cells according to the setpoint received by said storage block;
   a generator of signals allowing controlling the state of at least one controllable switch in order to modify the state of connection to at least one bus of at least one storage block;
   a device for analyzing the power supplied by a DC/DC converter of each storage block and the efficiency of said DC/DC converter, by means of PWM signals;
   a device for controlling the voltage at the output of the supply block.

13. The storage device according to claim 1, wherein the supply block comprises:
   an energy storage module allowing supplying energy to the master block when the storage device is set on standby;
   a power supply circuit connected at the output of the storage pack.

14. The storage device according to claim 1, wherein the supply block comprises a module for converting the current at the input of the supply block when the supplied current is of the alternating type, said conversion module comprising a rectifier bridge and a capacitor.

15. The storage device according to claim 1, wherein the power supply circuit comprises a galvanic isolation.

16. A method of managing the storage device according to claim 1, said management method comprising steps of:
- determining a voltage setpoint for each storage block from at least one general voltage and frequency setpoint;
- modifying the state of at least one connection sub-block of a storage block according to the voltage setpoint determined before.

17. The management method according to claim 16, also comprising a step of analyzing the voltage supplied by a storage block to a bus, said analysis step comprising substeps of:
- measuring the voltage supplied by said storage block to said bus;
- comparing the measured voltage with the voltage expected by the current setpoint associated with said storage block for said bus;
- identifying said defective storage block when the difference between the measured voltage and the voltage expected for said storage block is in absolute value higher than a predetermined threshold value;
- if said storage block is identified as defective, short-circuiting said storage block by controlling the electronic switch of the sub-block for connection to said bus.

18. The management method according to claim 16, wherein the determination of the voltage setpoint for each storage block takes account of the state-of-charge of each storage block.

19. An electronic component storing instructions for the implementation of the management method according to claim 16, the electronic component being accessed by a computing unit of the storage device of claim 1.

* * * * *